US005704195A

United States Patent [19]

Benz

[11] Patent Number: 5,704,195
[45] Date of Patent: Jan. 6, 1998

[54] METHOD AND MACHINE FOR PACKAGING CANS OR TUBES

[75] Inventor: Gottlieb Benz, Flums, Switzerland

[73] Assignee: Pamag AG, Switzerland

[21] Appl. No.: 734,051

[22] Filed: Oct. 18, 1996

[30] Foreign Application Priority Data

Nov. 17, 1995 [CH] Switzerland ............ 03264/95

[51] Int. Cl.[6] .................................... B65B 19/34
[52] U.S. Cl. .................. 53/444; 53/148; 53/201; 53/446; 53/447; 53/448; 53/537; 53/540; 53/544
[58] Field of Search ............... 53/147, 148, 149, 53/150, 201, 443, 444, 446, 447, 448, 535, 537, 540, 544

[56] References Cited

U.S. PATENT DOCUMENTS

| | | | |
|---|---|---|---|
| 3,262,243 | 7/1966 | Molins | 53/535 X |
| 3,279,145 | 10/1966 | Williamson | 53/148 X |
| 3,365,857 | 1/1968 | Liedtke | 53/148 |
| 3,599,396 | 8/1971 | Schmermund | 53/537 X |
| 4,514,956 | 5/1985 | Varallo et al. | 53/544 X |
| 4,633,652 | 1/1987 | Dagenais et al. | 53/448 X |
| 5,060,454 | 10/1991 | Benz | 53/448 X |
| 5,105,602 | 4/1992 | Ono | 53/444 X |
| 5,339,606 | 8/1994 | Benz | 53/444 |
| 5,388,385 | 2/1995 | Phelps et al. | 53/540 X |
| 5,570,567 | 11/1996 | Laubscher et al. | 53/446 X |

*Primary Examiner*—Daniel Moon
*Attorney, Agent, or Firm*—Speckman, Pauley & Fejer

[57] ABSTRACT

A method for packaging cans or tubes continuously delivered from a production installation to pick-up elements, which are moved in steps, of an intermediate station. A gripper device brings the cans or tubes in groups according to the desired number of pieces in a packaging layer to a delivery station. Each can or tube is deposited into a support element, after which the cans or tubes are pushed together out of the support elements into a loading station. The cans or tubes are placed at equal distances into the pick-up elements, wherein individual support elements are placed apart from each other at a predetermined distance. The cans or tubes are then deposited into the support elements at distances predetermined by the pick-up elements. The support elements are subsequently moved together until they touch each other, whereupon the cans or tubes are then pushed into the loading station. This method allows the use of the same apparatus for different can diameters with minimal changing effort.

12 Claims, 2 Drawing Sheets

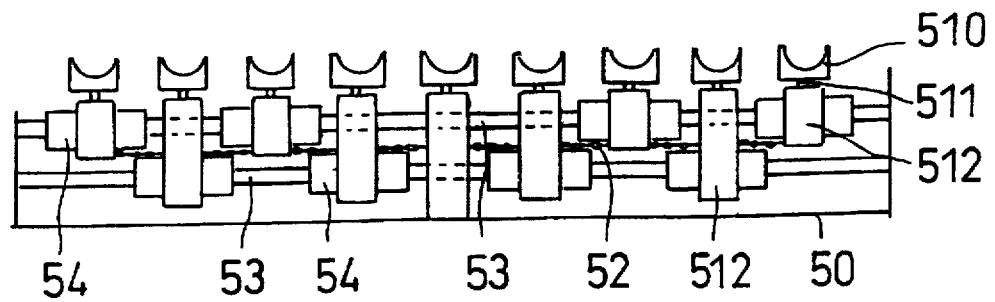
Fig.2
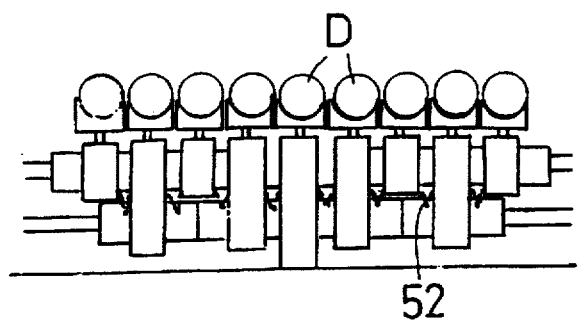
Fig.3
Fig.4
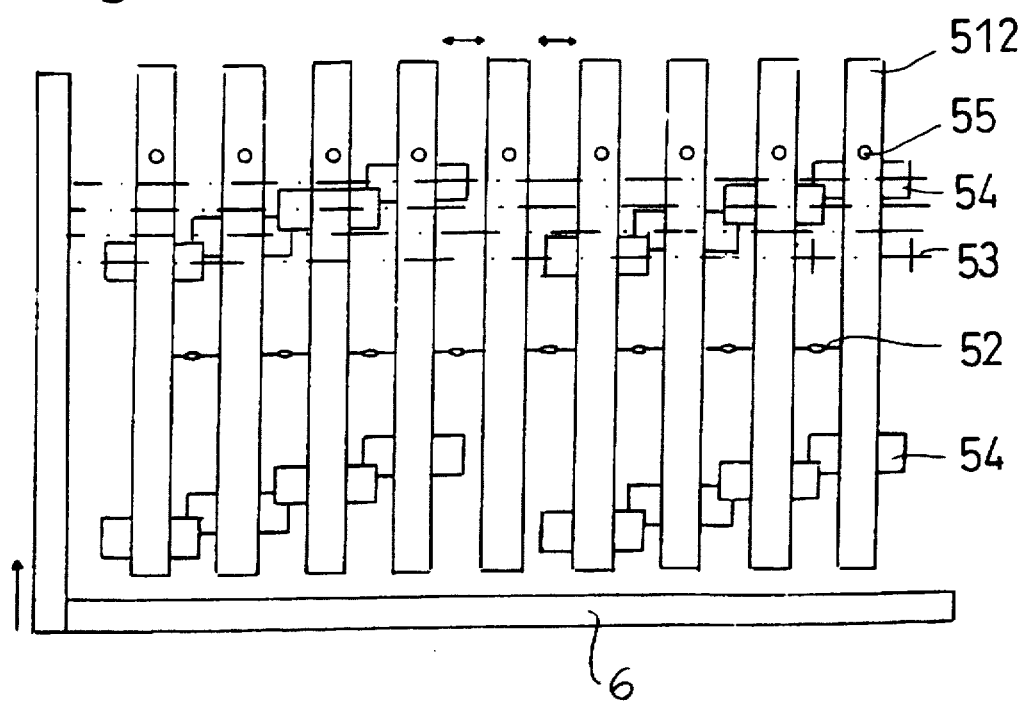

METHOD AND MACHINE FOR PACKAGING CANS OR TUBES

BACKGROUND OF THE INVENTION

1. Field of the Invention

This invention relates to a method for packaging cans or tubes, which are continuously moved from a production installation into pick-up elements, which is moved in steps, of a intermediate station, from where the cans or tubes, grouped in a packaging layer in accordance with the desired number, are brought to a delivery station by a gripper device. At the delivery station, each tube or can is placed into a support element, after which support elements move the cans or tubes together into a loading station. This invention further relates to a machine for executing the method.

2. Description of Prior Art

Applicant has previously produced a packaging machine for tubes or cans which has a large thoughput while being very easy to operate, yet treats the tubes or cans gently. The cans or tubes may also be packaged in different ways using this machine, such as into boxes of the most different sizes, or the cans or tubes may be enclosed in hoops.

This packaging machine essentially consists of an intermediate station with an endless belt movable in steps, on which pick-up elements are disposed, a gripper device, a delivery station with a depositing table on which support elements are disposed, and a pusher. The cans or tubes come continuously from a production installation into the pick-up elements, which are moved in steps. When the desired number of cans or tubes, which are intended to form a packaging layer, is present in the pick-up elements, this group is transported using suction cups of the gripper device to the delivery station, where each can or tube is placed into a support element. In the meantime the intermediate station, which functions as a compensator, is again filled with newly arrived cans or tubes.

The cans or tubes in the delivery station are pushed by the pusher transversely to their arranged direction, into the loading station. Depending on the type of packaging, in the process they enter into the ready box or, if they are enclosed by a hoop, into an appropriate hooping gauge. Before the cans or tubes are pushed off the depositing table, the depositing table is brought into the desired horizontal position in relation to the loading station. Thus a lateral displacement of the individual layers in accordance with the diameter of the cans or tubes is obtained, and thus tight and stable layering is made possible.

This method can be applied in connection with the most diverse sizes of cans or tubes. However, this packaging machine has the disadvantage that it is necessary to change the endless belt of the pick-up element, the vacuum suction cups and also the depositing table when the sizes of the cans or tubes are varied. This change requires a certain amount of time during which the machine is stopped. The change furthermore must be made by specialists. In addition, these packaging machines must be equipped with a lot of accessories for the different can diameters, which has an effect on the sales price.

SUMMARY OF THE INVENTION

It is one object of this invention to provide a method and a device which permit a simple change of the type of cans or tubes.

This object is attained by a method wherein cans or tubes are deposited, at even distances, into pick-up elements. Individual support elements are spaced apart from each other at a predetermined distance. The cans or tubes are deposited on the support elements at the distance predetermined by the pick-up elements. The support elements are then moved toward each other until they touch. The cans or tubes are then pushed into the loading station. The device according to this invention has an intermediate station with an endless prismatic belt, wherein spaces formed by the prisms constitute the pick-up elements. The support elements are displaceable with respect to each other and the maximum distance of the support elements from each other can be defined.

The method in accordance with this invention uses a flexible delivery station which is automatically set to the appropriate diameter of the cans or tubes. Regardless of their diameter, the cans or tubes are always inserted into the intermediate station at distances, calculated from their centers, which remain equal. This is made possible, for example, by the use of prisms as the pick-up elements. It is thus possible to use the same gripper device for different diameters of the cans or tubes, without it being necessary to change the distances between the vacuum suction cups.

When the cans or tubes are transferred, the support elements of the delivery station are disposed at the same distances as the pick-up elements of the intermediate station, so that the group of tubes or cans can be deposited therein without changes. However, since the tubes or cans are supposed to adjoin each other tightly in the packaging, the support elements are subsequently moved together until they touch.

It is thus possible to use the same prismatic belt and considerable portions of the delivery station for different can or tube diameters. When the can or tube diameter changes, it is therefore only necessary to change the support elements. However, these can have interchangeable dishes, so that a change can be performed by anybody.

The control required for setting the distances is extremely simple and can be achieved mechanically, such as by a simple connecting chain between the support elements.

With this process, the upper limit of the cans or tubes which can be packaged is determined by the maximally attainable distance between the support elements as well as by the fixed distance between the pick-up elements of the intermediate station. The lower limit is determined by what diameter sizes can still be held by the pick-up elements and support elements at a defined distance.

One preferred embodiment of this invention, by means of which the method of this invention is explained, is represented in the attached drawings.

BRIEF DESCRIPTION OF THE DRAWINGS

FIG. 2 is a side view of a delivery station of the device shown in FIG. 1, prior to the transfer of the cans to the delivery station;

FIG. 3 is a side view of the delivery station shown in FIG. 2, after the cans have been transferred to the delivery station; and FIG. 4 is a top view of the delivery station shown in FIG. 2.

DETAILED DESCRIPTION OF PREFERRED EMBODIMENTS

Figure 1:
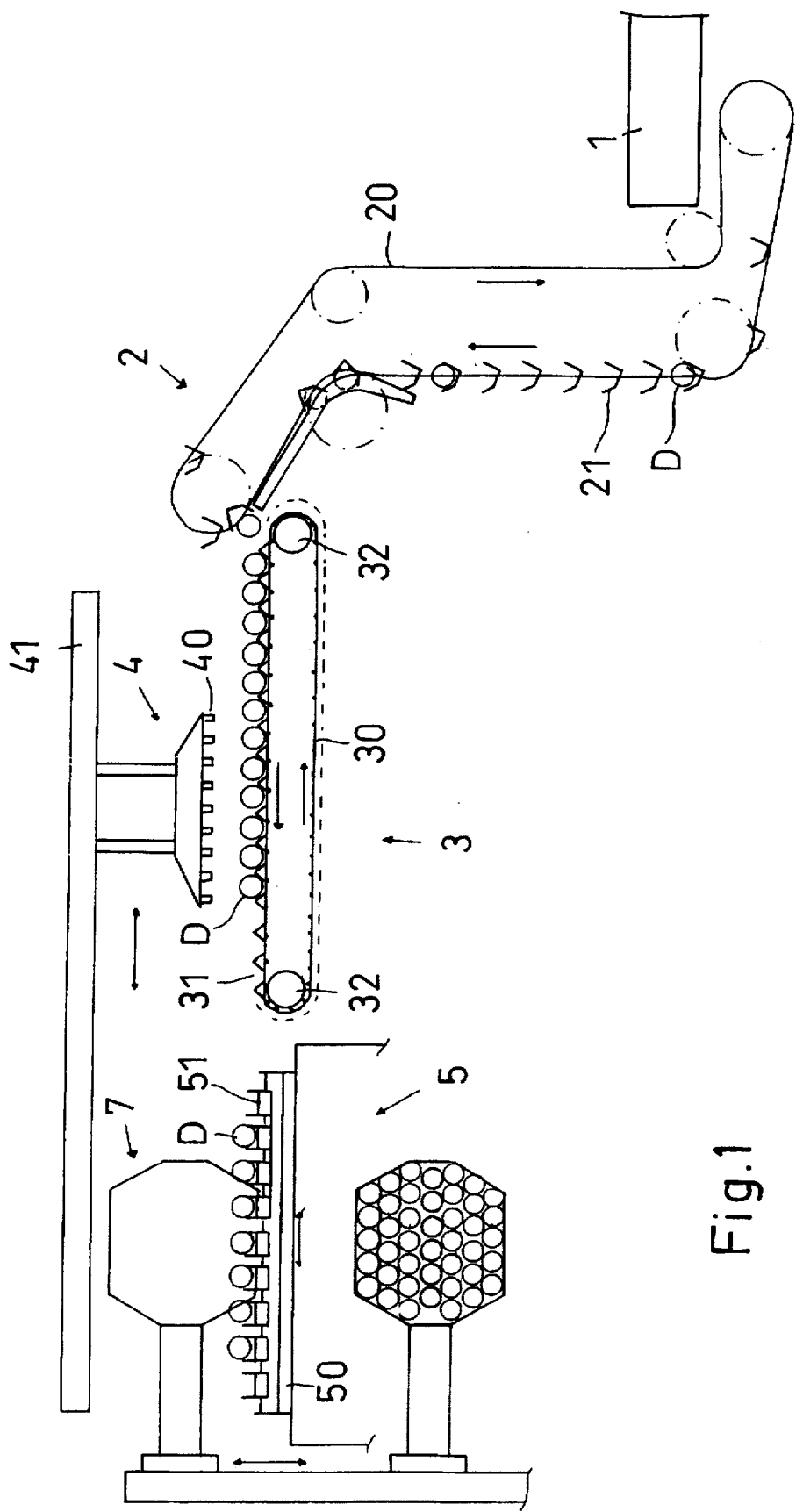
FIG. 1 is a schematic side view of a device in accordance with this invention, integrated in a production installation.

The entire structure of the device in accordance with this invention is shown in FIG. 1. The cans are delivered from the production site to the packaging machine by a conveyor installation 1. A transfer station 2 takes over the continuously delivered cans D, wherein each can D is received in a transfer dish 21. The transfer dishes 21 are a part of an endless transfer loop 20, which transports the filled dishes 21 continuously and sequentially to an intermediate station 3.

While moving through the loop, the transfer dishes 21 empty their cans D on the intermediate station 3, wherein each can D is transferred to a pick-up element 31. To this end, the intermediate station 3 has an endless prismatic belt 30 disposed on drive rollers 32 and operated in steps. The prismatic belt 30 is preferably made of plastic and has cams on its side facing the drive rollers 32 for engaging them.

The direction of movement of the step-by-step conveyance of the cans D is indicated by an arrow in FIG. 1 and is oriented away from the transfer station 2 in the horizontal direction, so that the cans D can be continuously placed on the prismatic belt 30.

The spaces formed by the prisms constitute the pick-up elements 31 of the intermediate station 3. These wedge-shaped spaces make it possible for cans of different diameter to be received in and conveyed by the same prismatic belt 30. In the process the cans D always come to rest centered in the spaces, wherein the smaller cans D sink deeper into the prismatic belt 30 than the larger cans D.

A step counter or an optical sensor monitors the number of cans D present on the prismatic belt 30. When a desired number, which subsequently is intended to form one layer in the packaging, has been reached, the gripper device 4 is actuated. This gripper device 4 includes several vacuum suction cups 40 at equal distances, each of which aspirates a can D. The suction cups 40 transport the desired number of cans D in a group to a delivery station 5. To do this, the gripper device 4 is moved along a horizontal shaft 41. In the meantime the prismatic belt 30 is still continuously filled.

In a preferred embodiment the gripper device 4 is additionally rotatable or pivotal. In a further embodiment, the position of the suction cups 40 of the gripper device 4 with respect to each other can be changed, so that their mutual distances from each other can be changed mechanically or electronically.

The pressure in the vacuum suction cups 40 is monitored. Should a pick-up element not contain any can D or a damaged one, an error message is issued. By means of the vacuum suction cups 40 it is also determined how many cans D are carried. Excess suction cups 40 are not activated. This is necessary because the size of the packaging varies and because some packages have layers with different amounts of pieces, for example the octagonal hoop illustrated here. In addition, the vacuum suction cups automatically, or because of pre-setting, match the different gripping heights of the cans D.

The delivery station 5 includes a depositing table 50, on which support elements 51 for receiving the cans D are disposed. The cans D are pushed transversely with respect to the direction of their arrangement into a loading station 7 by a pusher 6, shown in FIG. 4, wherein this loading station 7 can have packaging materials or gauges for placing hoops around the cans D as required.

The depositing table 50 with the support elements 51 will be described in greater detail.

The support elements 51 are seated so that they are displaceable in the direction of the arrangement of the cans D. The center support element is preferably fixed in place. The support elements 51 comprise support plates 512, on which interchangeable deposit dishes 510 are disposed. For this purpose the deposit dishes 510 of this preferred embodiment have pins 511, which can be inserted into corresponding bores of the support plates 512. The cans D are deposited into the deposit dishes 510. Therefore each deposit dish 510 has a trough corresponding to the particular diameter of the cans D to be packaged, wherein the trough does not have a raised part at least at one narrow end of the deposit dishes 510 so that it is possible to push the can D out of the dish.

The oblong support plates 512 are displaceably connected with each other by means of drive rods 53 extending through them, which can be pneumatically actuated. Adjoining support plates are preferably actuated by different drive rods 53. In this way it is possible to make the support plates very narrow, without the length of the drive cylinders 54 of the drive rods 53 being able to constitute a lower limit. As can be seen in FIG. 2, in this example there are respectively four drive rods 53 at both ends of the support plates 51 for this purpose, so that each fourth support plate 51 is actuated over the same drive rod 53.

The support plates 512 are connected with each other by a chain 52, a link chain in this case, wherein adjoining support plates are connected with each other. The chain 52 is used for defining the maximally obtainable distance of the support plates. In this case the length of the individual sections of the chain 52 is of such dimensions, that at their maximum distance the support plates 512, and thus the support elements 51, are arranged in the same way as the prisms of the intermediate station 3. Such a situation is represented in FIGS. 2 and 4. It is now possible in this position to transport the cans D from the prismatic belt 30 to the deposit dishes 510 without it being necessary to change their relative position with respect to each other, because the prismatic belt 30 and the depositing table are compatible with each other.

The deposit dishes 511 of the support plates 512 are moved together until the deposit dishes 511 touch each other. Because the deposit dishes 511 are particularly matched to the size of the cans D, the latter are now sufficiently close to each other to be passed on in a group as a layer to the loading station 7. This situation is represented in FIG. 3. If the cans D with a different diameter are to be packaged, it is merely necessary to change the deposit dishes 511, which can be performed by simply pushing them on the support plates.

So that the cans D are maintained in their position in the support elements 51 and do not jump when removed from the gripper device 4, the support plates 512 and the deposit dishes 511 have suction openings, so that the cans D are held in the troughs by vacuum pressure.

Since it is preferred to stack the individual layers from each other offset by half a diameter, the pushed-together support elements as a unit or the entire depositing table are displaced by the desired distance in the horizontal direction. Vertical displacement would also be possible, however, this is generally performed in the loading station.

In a further embodiment of the device in accordance with this invention, not shown in the drawings, the intermediate station 3 and the delivery station 5 are not in a line parallel with the direction of arrangement of the cans D, instead, they are disposed perpendicular to the direction of arrangement. By means of this the total length of the packaging machine is shortened. The pusher 6 is located between the two stations.

What is claimed is:

1. In a method for packaging a plurality of cans or tubes, which are continuously moved in steps from a production installation into a plurality of pick-up elements (31) of an intermediate station (3), wherein a gripper device (4) delivers the cans or tubes grouped in a packaging layer in accordance with a desired number to a delivery station (5), where each tube or can is placed into one of a plurality of support elements (51) and then moved together by the support elements into a loading station (7), the improvement comprising:

depositing the cans or tubes at evenly spaced distances into the pick-up elements (31);

depositing the cans or tubes upon the individual support elements (51), which are spaced apart from each other at a distance predetermined by the pick-up elements (31); and subsequently moving the support elements (51) toward each other until the support elements (51) touch and the cans or tubes which are pushed into the loading station (7).

2. The method in accordance with claim 1, wherein before being pushed into the loading station (7), the support elements (51) bring the cans or tubes into a desired position with respect to the loading station (7).

3. The method in accordance with claim 2, wherein a position of the cans or tubes with respect to the loading station (7) is in a horizontal direction, and the loading station (7) is positioned in a vertical direction.

4. The method in accordance with claim 1, wherein the gripper device (4) transports the cans or tubes by means of vacuum aspiration.

5. The method in accordance with claim 1, wherein the cans or tubes are maintained on the support elements (51) by means of vacuum aspiration.

6. The method in accordance with claim 1, wherein a center support element (51) of the support elements (51) remains stationary.

7. In an apparatus for packaging a plurality of cans or tubes, the apparatus having an intermediate station (3) with a plurality of pick-up elements (31) which are moved in steps, a gripper device (4), a delivery station (5) with a plurality of support elements (51), and a pusher (6), the improvement comprising:

the intermediate station (3) having an endless prismatic belt (30), a plurality of pick-up elements (31) formed by spaces of the prismatic belt (30); and the support elements (51) displaceably positioned with respect to each other, and means (52) for defining a maximum distance of the support elements (51) with respect to each other.

8. The apparatus in accordance with claim 7, wherein the support elements (51) each comprise a support plate (512) and an interchangeable deposit dish (510) removably mounted with respect to the support plate (512), for receiving the cans or tubes.

9. The apparatus in accordance with claim 7, wherein the support elements (51) are connected with respect to each other by a chain (52) which determines the maximum distance of the support elements (51) with respect to each other.

10. The apparatus in accordance with claim 7, wherein the support elements (51) are displaced by at least one pneumatically operated drive rod (53).

11. The apparatus in accordance with claim 7, wherein a plurality of drive rods (53) each actuates adjoining support elements (51) of the support elements (51).

12. The apparatus in accordance with claim 7, wherein the intermediate station (3) and the delivery station (5) are arranged in a line perpendicular to the arrangement directions of the pick-up elements (31) and the support elements (51).

* * * * *